United States Patent
Wu et al.

(10) Patent No.: US 8,743,473 B2
(45) Date of Patent: Jun. 3, 2014

(54) MINIATURE LENS AUTO-FOCUSING STRUCTURE

(75) Inventors: Fu-Yuan Wu, Yangmei Taoyuan (TW); Ying-Chien Hsueh, Yangmei Taoyuan (TW)

(73) Assignee: TDK Taiwan Corporation, Taipei (TW)

( * ) Notice: Subject to any disclaimer, the term of this patent is extended or adjusted under 35 U.S.C. 154(b) by 162 days.

(21) Appl. No.: 13/464,560

(22) Filed: May 4, 2012

(65) Prior Publication Data
US 2013/0293969 A1    Nov. 7, 2013

(51) Int. Cl.
*G02B 15/24*    (2006.01)

(52) U.S. Cl.
USPC .......................................... 359/698; 359/824

(58) Field of Classification Search
CPC ................................ G02B 7/102; G02B 7/282
USPC ................................................... 359/698, 824
See application file for complete search history.

(56) References Cited

U.S. PATENT DOCUMENTS

2009/0122420 A1*   5/2009   Sue et al. ...................... 359/696

\* cited by examiner

*Primary Examiner* — Thomas K Pham
*Assistant Examiner* — Vipin Patel
(74) *Attorney, Agent, or Firm* — Muncy, Geissler, Olds & Lowe, P.C.

(57) ABSTRACT

A miniature lens auto-focusing structure includes a housing having a top plate; a base plate connectable to the housing to define an inner space between them; a lens module wound around by a coil; and at least one spring member holding and suspending the lens module in the inner space without causing the lens module to contact with the top plate and the base plate. With these arrangements, the spring member is not in a pre-tensioning state when the miniature lens auto-focusing structure is in a non-actuated state. Therefore, the miniature lens auto-focusing structure requires less actuating current and has smaller lens tilt angle than the conventional VCM auto-focusing structure, and can be manufactured at further reduced component cost.

5 Claims, 9 Drawing Sheets

MINIATURE LENS AUTO-FOCUSING STRUCTURE

FIELD OF THE INVENTION

The present invention relates to a miniature lens auto-focusing structure, and more particularly to a miniature lens auto-focusing structure that is actuated with a voice coil motor (VCM).

BACKGROUND OF THE INVENTION

With the progress in the scientific technological fields and in the modularization and miniaturization of camera lens, it is now possible to produce digital cameras having a very small volume, and most of currently available mobile phones are now provided with the function of a digital camera. There are many different auto-focus actuating mechanisms available for a miniature lens. Among others, the voice coil motor (VCM) is the currently most widely employed auto-focus actuating structure. The VCM has the advantages of small volume, low power consumption, accurately actuated displacement, and cost-effective, and is therefore very suitable for short-distance actuation in miniature lens auto-focusing.

Figure 1:
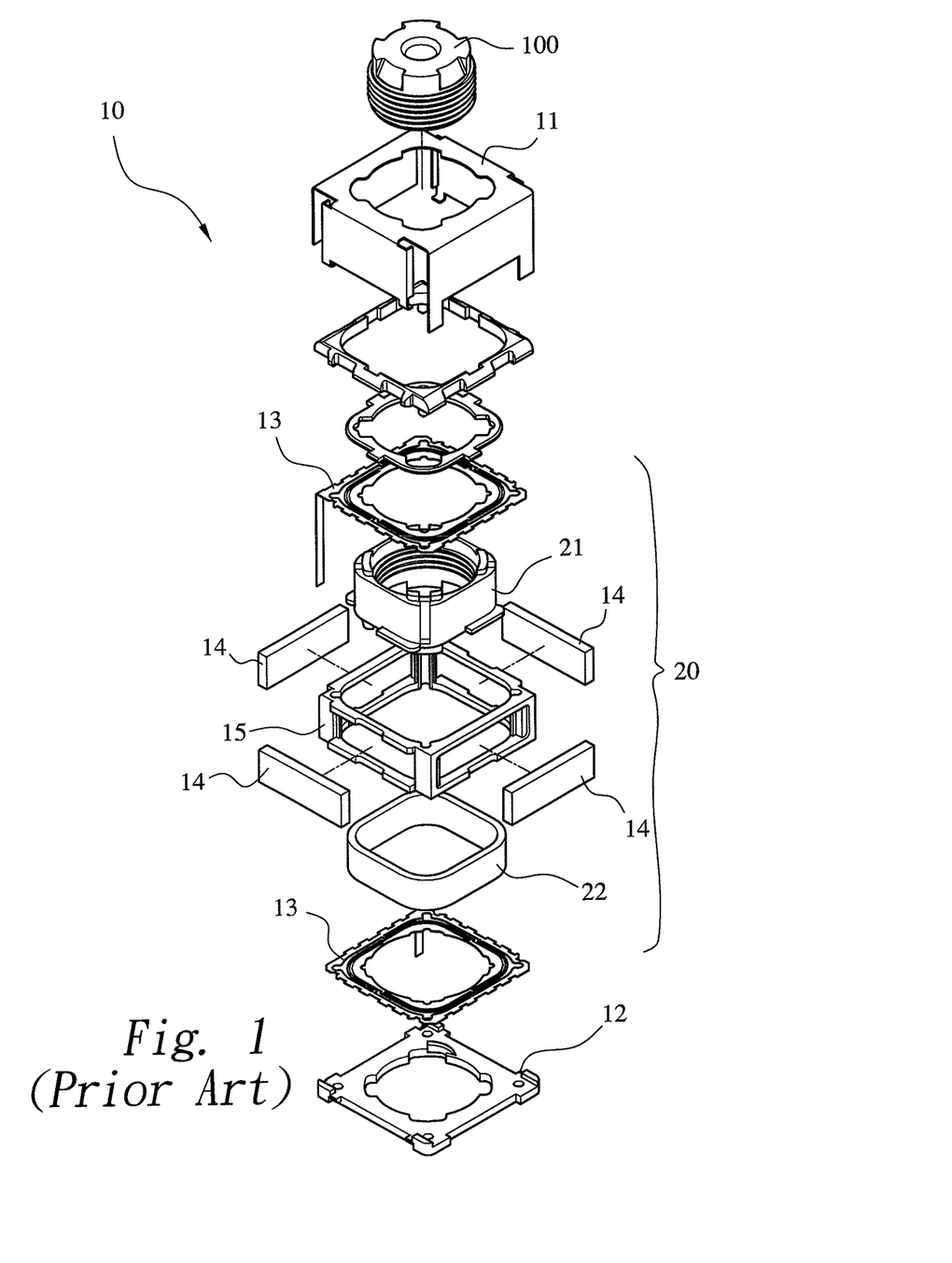
FIG. 1 is an exploded perspective view of a conventional VCM auto-focusing structure.
Figure 2:
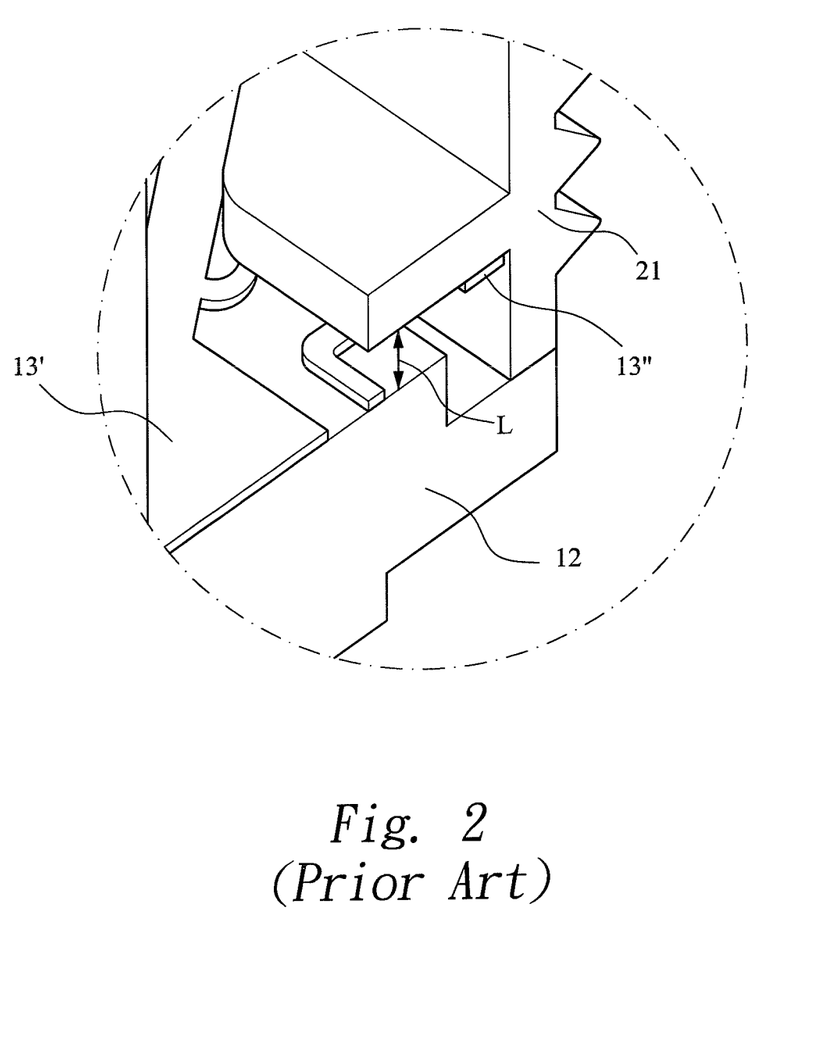
FIG. 2 is a fragmentary, enlarged perspective view of the conventional VCM auto-focusing structure of FIG. 1.

FIG. 1 is an exploded perspective view of a conventional VCM auto-focusing structure 10, and FIG. 2 is a fragmentary, enlarged perspective view of the conventional VCM auto-focusing structure 10 of FIG. 1. As can be seen from FIGS. 1 and 2, the VCM auto-focusing structure 10 holds and moves a lens assembly 100 forward and rearward, so that the lens assembly 100 focuses the image of an object being shot on a light sensor device (not shown). The conventional VCM auto-focusing structure 10 mainly includes a housing 11 and a bottom cover 12. The housing 11 is internally provided with a lens holding mechanism 20 for holding and moving the lens assembly 100 to perform auto focusing. In the lens holding mechanism 20, an upper and a lower spring plate 13 are used to connect to an inner top of the housing 11 and to an inner surface of the bottom cover 12, respectively. The lens holding mechanism 20 further includes a lens holder 21 wounded around by a coil 22, and four magnets 14 provided in the housing 11 on four inner wall surfaces thereof and fixed in place via a magnet holding frame 15. When the coil 22 is supplied with electric current, a magnetic field is emitted at the coil 22 to magnetically attract or repulse the magnets 14, so that the lens holder 21 is pushed forward or rearward to achieve the purpose of auto focusing.

Figure 3:
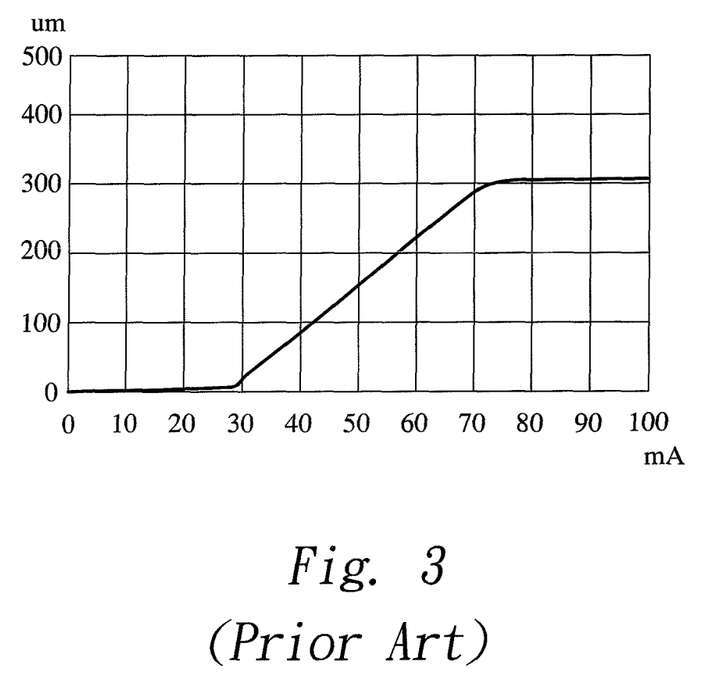
FIG. 3 shows the characteristic curve of the actuating current for the conventional VCM auto-focusing structure.

As can be seen from FIG. 2, the bottom cover 12 for the conventional VCM auto-focusing structure 10 has a stepped inner surface. The lower spring plate 13 is connected at an outer fixed portion 13' thereof to the inner surface of the bottom cover 12, and at an inner movable portion 13" thereof to a bottom surface of the lens holder 21. There is a distance L in an axial direction between the fixed portion 13' and the movable portion 13" of the lower spring plate 13. This is because the lens holding mechanism 20 utilizes an elastic pull force of the movable portion 13" to pull the lens holder 21 closer to the inner surface of the bottom cover 12, so that the movable portion 13" is pulled away from the fixed portion 13' of the lower spring plate 13 by the distance L. Due to the distance L existing between the fixed and the movable portion 13', 13", the lower spring plate 13 generates a pre-tension, which necessitates more electric power to offset the pre-tension of the lower spring plate 13 before the lens holding mechanism 20 can be actuated. FIG. 3 shows a characteristic curve of the actuating current for actuating the conventional VCM auto-focusing structure 10. As shown, a relatively high amount of current about 20-30 mA is required to actuate the VCM auto-focusing structure 10. This is why the conventional VCM auto-focusing structure 10 needs four magnets to induce greater magnetic attraction and repulsion relative to the electromagnetic force of the coil 22 to actuate the auto focusing.

Figure 4:
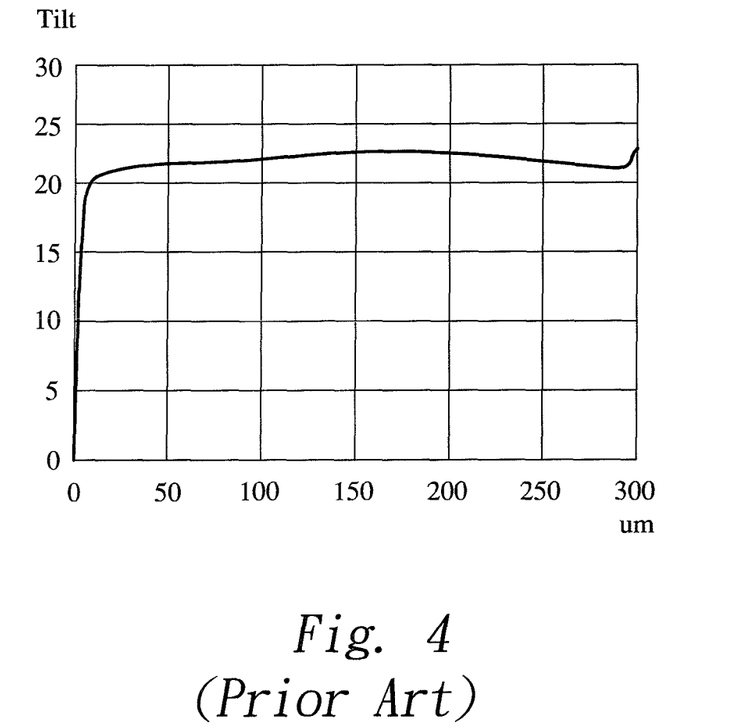
FIG. 4 shows the lens tilt characteristic of the conventional VCM auto-focusing structure at actuation thereof.

FIG. 4 shows the lens tilt characteristic of the conventional VCM auto-focusing structure at actuation thereof. Since the lens holder 21 is in contact with the inner surface of the bottom cover 12, and since the lower spring plate 13 might provide non-uniform elastic pull force due to insufficient flat contact between it and the bottom cover 12 or the housing 11, the lens holder 21 tends to tilt by an angle of about 20~23 minutes (1 degree=60 minutes) at the instant the lens holding mechanism 20 is actuated to perform auto focusing. The lens tilt would adversely reduce the usable resolution of the lens. For example, in the event of a 20-minute lens tilt angle, the lens can only provide a resolution of 5 million pixels. However, when the lens tilt angle is reduced to 5 minutes, a lens resolution of 8 million pixels can be obtained.

SUMMARY OF THE INVENTION

It is therefore a primary object of the present invention to provide a miniature lens auto-focusing structure that requires less actuating current and has smaller lens tilt angle than the conventional VCM auto-focusing structure to enable faster focusing and higher focus resolution, and can be manufactured at reduced component cost.

To achieve the above and other objects, the miniature lens auto-focusing structure according to the present invention includes a housing having a top plate defining a central opening; a base plate connectable to the housing to define an inner space between them; a lens module wound around by a coil; and at least one spring member having an outer immovable portion and an inner movable portion. The spring member is connected at the outer immovable portion to the top plate or the base plate and at the inner movable portion to the lens module to thereby hold the lens module in the inner space without causing the lens module to contact with the top plate and the base plate. Therefore, the spring member is not in a pre-tensioning state and the lens module is suspended in the inner space when the auto-focusing structure is in a non-actuated state.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

The present invention will now be described with a preferred embodiment thereof and with reference to the accompanying drawings. It is understood the accompanying drawings are only illustrative and not intended to limit the present invention in any way.

Figure 5:
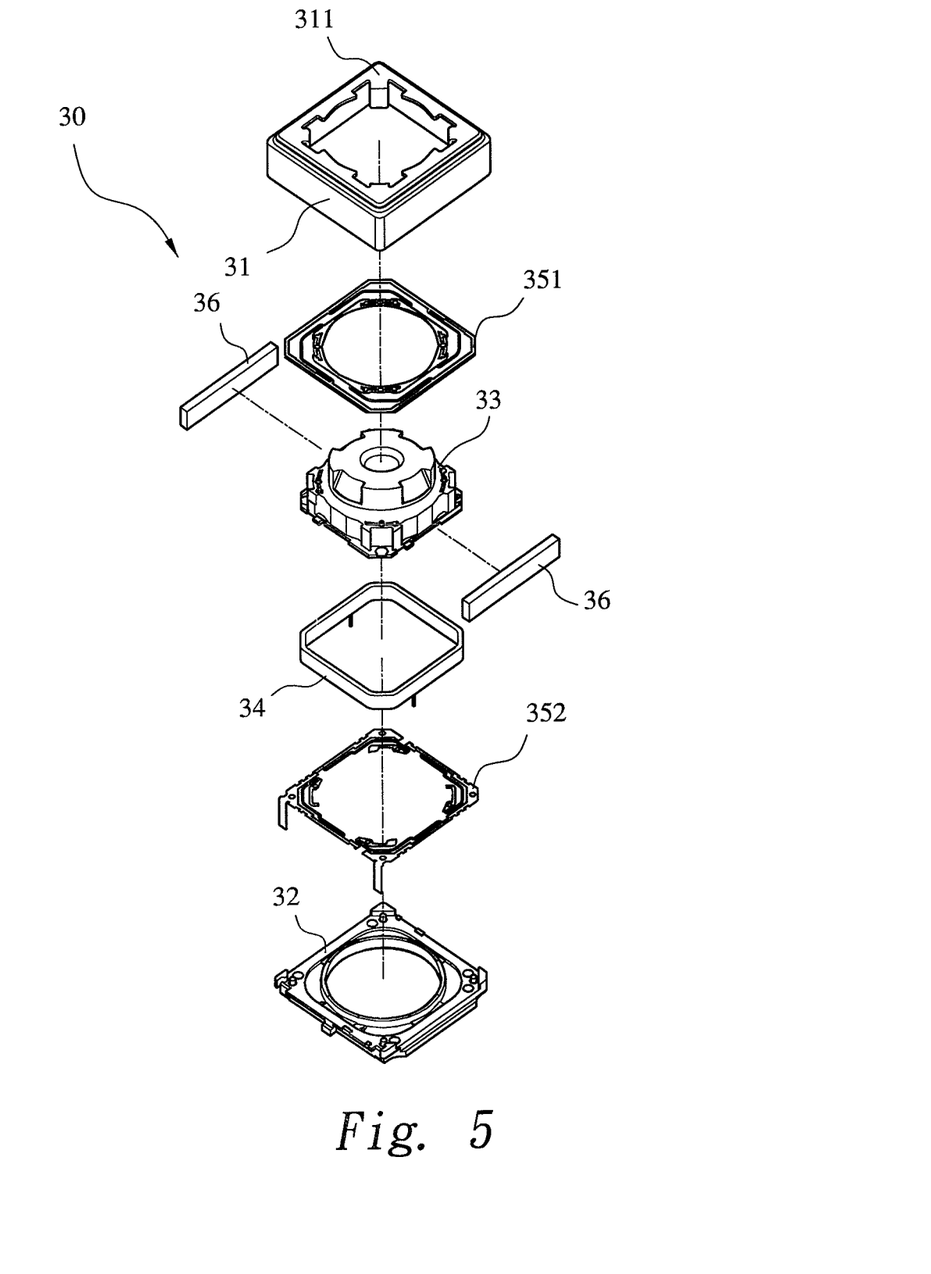
FIG. 5 is an exploded perspective view of a miniature lens auto-focusing structure according to a preferred embodiment of the present invention.
Figure 6:
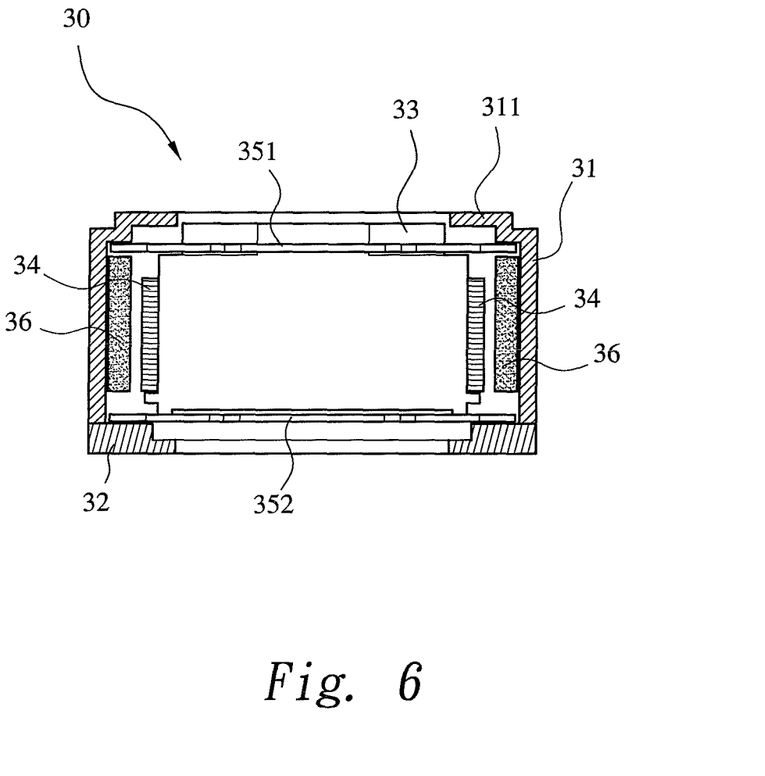
FIG. 6 is an assembled sectional side view of the miniature lens auto-focusing structure of the present invention.

Please refer to FIG. 5 that is an exploded perspective view of a miniature lens auto-focusing structure 30 according to an embodiment of the present invention, and to FIG. 6 that is an assembled sectional side view of FIG. 5. As shown, the miniature lens auto-focusing structure 30 includes a housing 31, a base plate 32, a lens module 33, a coil 34, and at least one spring member 35. The housing 31 includes a top plate 311 defining a central opening. The top plate 311 is integrally formed with the housing 31, and has four stepped edges to thereby define a raised central portion. The housing 31 and the base plate 32 are assembled to each other to define an inner space therebetween. The base plate 32 defines a central opening having a stepped inner circumferential edge, and therefore has a recessed central portion.

The lens module 33 has a central hole for receiving a lens component therein. The lens module 33 may include, for example, the lens holder 21 and the lens assembly 100 shown in FIG. 1. In the embodiment illustrated in FIG. 5, the lens module 33 is an integrally formed lens assembly with the coil 34 wound around it.

As can be seen from FIG. 5, the miniature lens auto-focusing structure 30 of the present invention further includes at least one magnetic element 36 magnetically attached to an inner wall surface of the housing 31 to correspond to the coil 34 without physically contacting with the coil 34. Preferably, two magnetic elements 36 are provided and magnetically attached to two inner wall surfaces corresponding to two opposite sides of the coil 34 without physically contacting with the coil 34.

Figure 7:
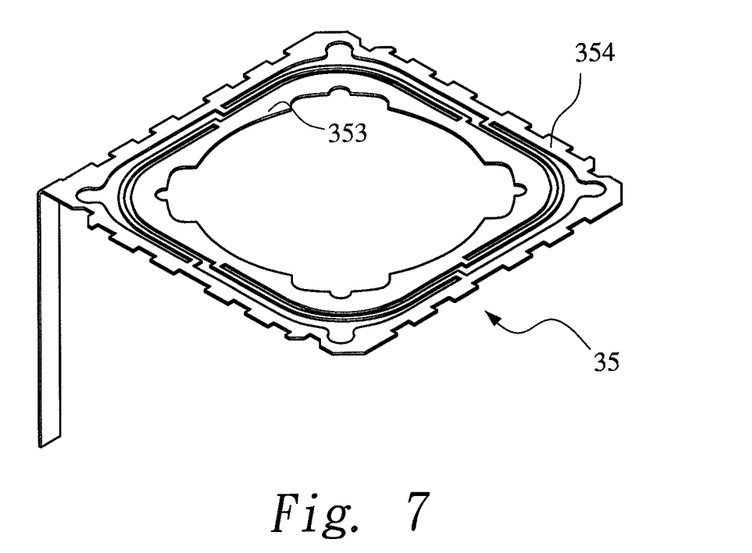
FIG. 7 is a perspective view of a spring member used in the miniature lens auto-focusing structure of the present invention.

FIG. 7 is a perspective view of the spring member 35. Please refer to FIGS. 6 and 7 at the same time. The spring member 35 includes an inner movable portion 353 and an outer immovable portion 354. The spring member 35 is connected at the inner movable portion 353 to the lens module 33 and at the outer immovable portion 354 to the top plate 311 or to the base plate 32, so as to hold and suspend the lens module 33 in the inner space defined between the connected housing 31 and base plate 32.

Preferably, two spring members 35, namely, a first spring member 351 and a second spring member 352, are provided. Both the first and second spring members 351, 352 include an inner movable portion 353 and an outer immovable portion 354.

The immovable portion and the movable portion of the first spring member 351 are fixedly connected to the top plate 311 and an upper periphery of the lens module 33, respectively. More specifically, the immovable portion of the first spring member 351 is connected to the lowest area on the inner surfaces of the top plate 311, so that a distance is formed between lens module 33 and the highest areas of the inner surfaces of the top plate 311.

The movable portion and the immovable portion of the second spring member 352 are connected to a lower periphery of the lens module 33 and the highest area on the inner surfaces of the base plate 32, respectively, such that a distance is formed between the lens module 33 and the lowest area on the inner surfaces of the base plate 32. The lens module 33 is therefore held by the first spring member 351 and the second spring member 352 to suspend in the inner space defined between the connected housing 31 and base plate 32 without contacting with the top plate 311 and the base plate 32. With these arrangements, the movable portions of the spring members 35 are not in a pre-tensioning state when the miniature lens auto-focusing structure of the present invention is in a non-actuated state.

However, it is also possible in the present invention to use only one spring member 35. For instance, only the first spring member 351 or the second spring member 352 is used in the miniature lens auto-focusing structure. Since the construction and the connection between different components of the miniature lens auto-focusing structure according to the present invention are the same when only the first or the second spring member is used, it is not repeatedly described herein.

Figure 8:
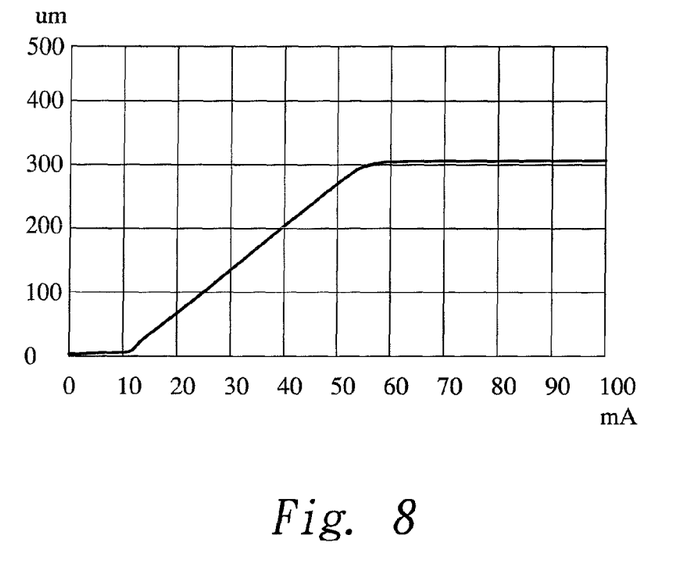
FIG. 8 shows the characteristic curve of the actuating current for the miniature lens auto-focusing structure of the present invention.
Figure 9:
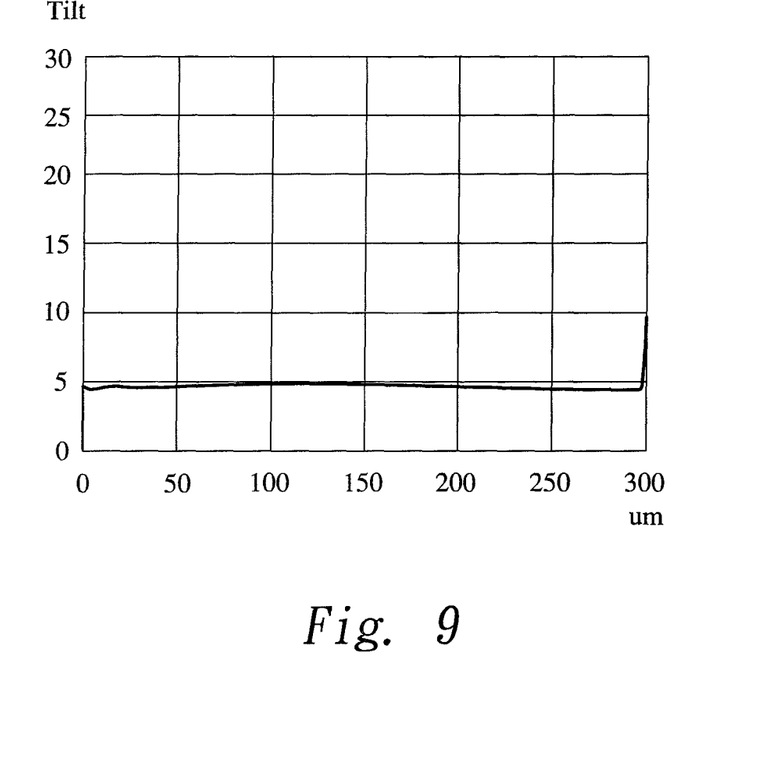
FIG. 9 shows the lens tilt characteristic of the miniature lens auto-focusing structure according to the present invention at actuation thereof.

FIG. 8 shows the characteristic curve of the actuating current for the present invention, and FIG. 9 shows the lens tilt characteristic of the auto-focusing structure of the present invention at actuation thereof. According to the present invention, when the lens module 32 is held by the spring member 35 to suspend in the inner space between the connected housing 31 and base plate 32, the spring member 35 is not in a pre-tensioning state. Therefore, the auto-focusing structure 30 can be actuated with an actuating current as low as 10 mA, which is much lower than the 20~30 mA needed by the conventional VCM auto-focusing structure 10. Further, as can be seen from FIG. 9, since the spring member 35 is not pre-tensioned, the tilt of the lens module 33 can always be maintained below a 5-minute angle, which is much better as compared to the 20-minute tilt angle in the conventional VCM auto-focusing structure 10. As it is known, the smaller the lens tilt angle is, the higher lens resolution can be obtained. Therefore, the present invention is highly useful to the camera lens that requires higher and higher resolution.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A miniature lens auto-focusing structure, comprising:
   a housing including a top plate which defines a central opening, and being connectable to a base plate to define an inner space between the connected housing and top plate, wherein the top plate is integrally formed with the housing, and has four stepped edges to thereby define a raised ventral portion, and the base plate has a stepped inner circumferential edge to thereby define a recessed central portion;
   a lens module being wound around by a coil; and
   a first and a second spring members including an inner movable portion and an outer immovable portion; the first and second spring members being connected at the inner movable portion to the lens module, and the first spring member being connected at the outer immovable portion to the lowest area of the four stepped edges of the top plate, and the second spring member being connected at the outer immovable portion to the highest area of the stepped inner circumferential edge of the base plate, to thereby hold the lens module in the inner space defined between the connected housing and base plate without causing the lens module to contact with the top plate and the base plate, enabling the lens module to suspend in the inner space when the miniature lens auto-focusing structure is in a non-actuated state.

2. The miniature lens auto-focusing structure as claimed in claim 1, wherein the first spring member is connected at the movable portion to an upper periphery of the lens module and at the immovable portion to the housing.

3. The miniature lens auto-focusing structure as claimed in claim 1, wherein the second spring member is connected at the movable portion to a lower periphery of the lens module and at the immovable portion to the base plate.

4. The miniature lens auto-focusing structure as claimed in claim 1, further comprising at least one magnetic element magnetically attached to inner wall surfaces of the housing to correspond to the coil without contacting with the coil.

5. The miniature lens auto-focusing structure as claimed in claim 1, wherein the outer immovable portion and the inner movable portion of the first spring member are connected to the top plate and an upper periphery of the lens module, respectively; and the outer immovable portion and the inner movable portion of the second spring member are connected to the base plate and a lower periphery of the lens module, respectively.

* * * * *